US010154062B2

(12) United States Patent
Venkataramanan et al.

(10) Patent No.: US 10,154,062 B2
(45) Date of Patent: Dec. 11, 2018

(54) RULE LOOKUP USING PREDICTIVE TUPLES BASED RULE LOOKUP CACHE IN THE DATA PLANE

(71) Applicant: Freescale Semiconductor, Inc., Austin, TX (US)

(72) Inventors: Subhashini A. Venkataramanan, Fremont, CA (US); Srinivasa R. Addepalli, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 227 days.

(21) Appl. No.: 14/865,674

(22) Filed: Sep. 25, 2015

(65) Prior Publication Data

US 2017/0093914 A1 Mar. 30, 2017

(51) Int. Cl.
*H04L 29/06* (2006.01)
*H04L 29/08* (2006.01)

(52) U.S. Cl.
CPC ............ *H04L 63/20* (2013.01); *H04L 63/101* (2013.01); *H04L 67/141* (2013.01)

(58) Field of Classification Search
CPC ....... H04L 63/101; H04L 63/20; H04L 67/14; H04L 67/141; H04L 67/142; H04L 67/146
See application file for complete search history.

(56) References Cited

U.S. PATENT DOCUMENTS

| | | | |
|---|---|---|---|
| 6,170,012 B1 | 1/2001 | Coss et al. | |
| 6,772,347 B1 | 8/2004 | Xie et al. | |
| 7,415,012 B1 | 8/2008 | Mankins | |
| 8,065,719 B2 | 11/2011 | Yang | |
| 2009/0172800 A1 | 7/2009 | Wool | |
| 2011/0154471 A1* | 6/2011 | Anderson | G06F 9/54 726/11 |
| 2012/0320788 A1* | 12/2012 | Venkataramanan | H04L 47/2458 370/253 |
| 2014/0095782 A1* | 4/2014 | Koktan | H04L 45/60 711/108 |
| 2014/0156720 A1* | 6/2014 | Janakiraman | H04L 47/122 709/202 |

(Continued)

FOREIGN PATENT DOCUMENTS

EP 0909075 4/1999

OTHER PUBLICATIONS

Technical Report TR-146, Subscriber Sessions, The Broadband Forum, May 2013, 46 pages.*

(Continued)

*Primary Examiner* — Hadi S Armouche
*Assistant Examiner* — Huan V Doan (57) ABSTRACT

This disclosure describes an approach to handle packets that arrive at a network security device, such as a router. At a data plane of the security device, packet identifiers included in an incoming packet not currently belonging to an IP session of the device are compared to packet identifiers stored in a table stored in a memory of the security device. The incoming packet identifiers includes a source IP, a destination IP, a protocol, a destination port, and a source port while the identifiers stored in the table do not include the source port. A new session is established for the incoming packet in response to the set of packet identifiers matching one of the entries in the table.

13 Claims, 7 Drawing Sheets

(56) References Cited

U.S. PATENT DOCUMENTS

| | | | |
|---|---|---|---|
| 2015/0124608 A1* | 5/2015 | Agarwal | H04L 47/122 370/235 |
| 2015/0180783 A1* | 6/2015 | Crasta | H04L 47/2483 370/235 |
| 2015/0194215 A1* | 7/2015 | Douglas | G11C 15/04 711/108 |
| 2016/0072717 A1* | 3/2016 | Ansari | H04L 47/34 370/412 |

OTHER PUBLICATIONS

Curtis et al., DevoFlow: Scaling Flow Management for High-Performance Networks, 12 pages (Year: 2011).*

Bianco et al., OpenFlow Switching: Data Plane Performance, IEEE, 5 pages (Year: 2010).*

* cited by examiner

Predictive Tuples Based Rule Assist Cache (PTBRAC)
340

| Tuples Match Criteria 400 | | | | Metadata (optional) [identifies subset of rules to process, if empty then no rules checking necessary]] 450 | Configuration Identity 460 | Action Information [NAT, etc.] 470 |
|---|---|---|---|---|---|---|
| Source IP 410 | Destination IP 420 | Protocol 430 | Destination Port 440 | | | |
| SIP 1 | DIP 1 | Protocol 1 | DP 1 | [Empty or rule list] | [Integer value] | [NAT, etc.] |
| SIP 1 | DIP 1 | Protocol 1 | DP 1 | [Empty or rule list] | [Integer value] | [NAT, etc.] |
| SIP 1 | DIP 1 | Protocol 1 | DP 1 | [Empty or rule list] | [Integer value] | [NAT, etc.] |
| ⋮ | ⋮ | ⋮ | ⋮ | ⋮ | ⋮ | ⋮ |
| SIP 1 | DIP 1 | Protocol 1 | DP 1 | [Empty or rule list] | [Integer value] | [NAT, etc.] |

RULE LOOKUP USING PREDICTIVE TUPLES BASED RULE LOOKUP CACHE IN THE DATA PLANE

TECHNICAL FIELD

The present disclosure relates to processing packets by a network appliance, such as a router.

BACKGROUND

Connection (session) rate numbers are used to rate the capacity and capability of a Security Device, such as a router. It refers to the number of sessions that can be established within a particular time interval. These numbers directly depend on how quickly a rule set can be searched. Security Applications are programmed with a set of access control rules, other types of rule sets, and/or policies set by the Administrator (collectively, any such access rules or policies are referred to herein as Access Control Lists (ACLs). The security device consults the configured ACLs to determine whether the packet should be allowed or denied and the processing that needs to be applied to the packet.

The ACLs are maintained in a prioritized order so that the first rule in the ACLs that matches an incoming packet is the rule that is used with no further rules in the ACLs needing to be checked. The ACLs may be maintained as a single rule table or in multiple tables. IP Tables are generally organized in multiple tables. A rule match occurs when the Source IP, Destination IP, Source Port, Destination Port and Protocol of a packet matches with the highest priority configured rule in the ACLs. When a rule match occurs that allows a packet, a session is typically created so that the remaining packets of that particular session need not go through ACL policy lookup. The five tuples of the packet are added to a session table that is maintained in the memory of the security device.

The security device applications are typically architected in a Control Plane/Data Plane Model. The Control Plane (CP) holds the ACL rule set and performs rule checks while the Data Plane (DP) performs the packet processing. When a packet arrives at the security device, the DP consults the session table to determine whether a session has already been established for the session. If a session is not found, the DP sends an exception packet to the CP. The CP then checks the ACLs against the packet to determine if packets belonging to the session should be allowed at the security device. In some cases, the CP consults multiple rule tables included in the ACLs before creating a session in DP. For example, in the case of IP tables, five tables are generally consulted, some of the tables are consulted multiple times (these tables include the Filter table, the NAT table, the Mangle table, the Raw table, and the Security table).

If, after consulting the ACLs, the CP decides to allow the packet, then the CP pushes the session to the DP which updates the session table. The DP processes subsequent packets for the session till the session expires, without subsequent packets having to go through the CP. Because of the many rule lookups performed during CP processing, a bottleneck occurs when processing a packet that does not yet have an established session.

Approaches such as Policy de-correlation or alternate arrangement of rules have been used to improve connection rate performance. However, these approaches have drawbacks. These approaches consume a great deal of memory to store the de-correlated set. In addition, these approaches require additional processing time to re-compile the de-correlated set whenever rules are added, modified, or deleted. Consequently, these existing implementations that have memory and processing constraints continue to experience a performance issue during connection establishment.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

FIGS. 1-7 illustrate a network security device, such as a router, that introduces a Predictive Tuples Based Rule Assist Cache (PTBRAC) in the data plane of the security device. The data plane checks some of the packet identifiers against sets of previously validated identifiers stored in the PTBRAC to determine whether a new session can be established for a new packet without performing more extensive, and time consuming, rules checking by the control plane of the security device. The PTBRAC includes a matching rule or a subset of two or more rules. The PTBRAC is used by the Data Plane to establish future repetitive sessions faster, without requiring rule checking by the Control Plane, thus increasing the connection setup rate over traditional approaches.

In one embodiment, the identifiers that are compared include the Source IP, Destination IP, Destination Port and Protocol. The inclusion of these identifiers is because rules are typically configured by specifying only these four tuples—Source IP, Destination IP, Destination Port and Protocol with the Source Port usually being a wild card indicating that any Source Port matches the rule. In real life, traffic patterns indicate that there are many repetitive connections from the same client to the same server machine. (Source Port differs across connection). This prediction is exploited to predict future sessions that might be established in the PTBRAC. The PTBRAC is managed to handle predictive future sessions and is a four tuple based table without a Source Port field.

Figure 1:
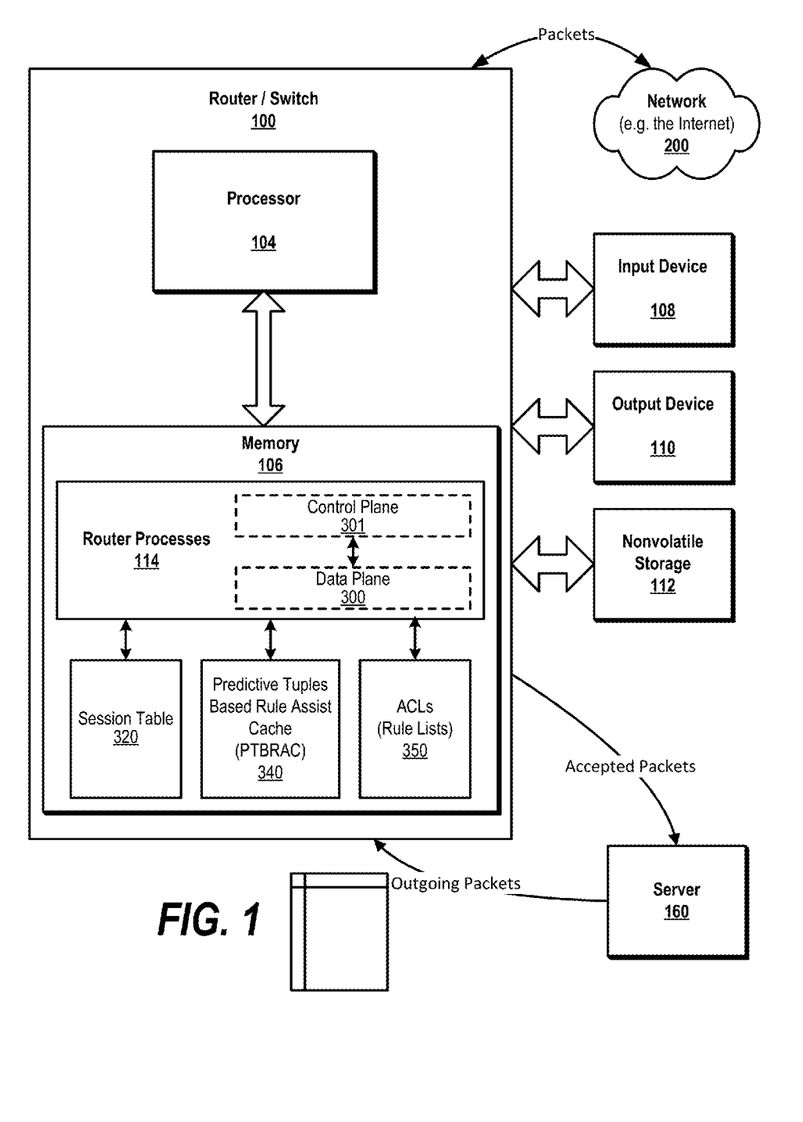
FIG. 1 is a block diagram of a security device, such as a router, in which an embodiment of the present invention may be implemented.

FIG. 1 illustrates router 100 which is a simplified example of a router capable of performing the routing operations described herein. Router 100 is a specialized data processing system that includes a processor, or processors 104, and a memory 106. Router management process 114 is shown to be resident in memory 106 and manages Session Table 320, Predictive Tuples Based Rule Assist Cache (PTBRAC 340), and Rule Lists (ACLs 350), as described herein in order to manage access. An input device 108 and an output device 110 are connected to computer system 102 and represent a wide range of varying I/O devices such as disk drives, keyboards, modems, network adapters, printers and displays. Nonvolatile storage device 112, includes a disk drive, nonvolatile memory, optical drive, or any other nonvolatile storage device, is shown connected to computer system 102. In one aspect, router 100 is used to filter incoming packets received from network 150, such as the Internet. Packets that are accepted after being processed by router process 114 using Session Table 320, PTBRAC 340, and ACLs 350, are passed to server 160 for processing. Router 100 may also be used to receive outgoing packets from server 160 and transmit them to a device interconnected to the router via network 150.

As described herein, tuple matching data is added to PTBRAC 340 during the processing of packets. PTBRAC 340 is a cache utilized by data plane 300 that can grant access to some new packets, and create new sessions, without having control plane 301 perform more time consuming rule matching that utilizes ACLs 350.

When a packet arrives from a source for a first time, the control plane matches the Source IP, the Destination IP, the Source Port, the Destination Port, and the protocol of the packet against rules in ACLs 350. When a rule match occurs, a session is created in session table 320. When the control plane pushes sessions to the data plane, the control plane can add tuple matching data to PTBRAC 340. In addition, the control plane can add "metadata," which are a subset of rules, when adding entries to the PTBRAC. When processing a packet, the control plane determines whether an entry can be added to PTBRAC 340 with no metadata, indicating that future packets matching the tuple data found in the entry can be immediately added to the session table without any further rule checking by the control plane. The control plane can instead add an entry to the PTBRAC with metadata that reference a subset of rules that need to be checked when a new packet is received. Finally, if the control plane determines that a further search of the complete set of rules is needed for a predictive future session, then no entry is added to the PTBRAC ensuring that subsequent matching packets are processed by the complete list of rules in the ACLs.

When the data plane of the security device receives a packet that is not already in the session table, the PTBRAC is checked by the data plane. One of three conditions can occur. First, the data plane can find a PTBRAC entry matching the four tuples of the incoming packet with the entry having no metadata. In the first case, the rule in the PTBRAC is applied and, in the case of an allowed packet, a new session is created for subsequent packets without rule checking by the control plane. Second, the data plane can find a PTBRAC entry matching the four tuples of the incoming packet with the entry having metadata corresponding to a subset of rules. In the second case, an exception is passed to the control plane from the data plane with the metadata, or subset of rules, also being passed to the control plane. During exception processing, the control plane checks the subset of rules against the packet instead of checking the complete set of rules in ACLs 350. Third, the data plane can fail to find any matching entries in the PTBRAC. In this third case, an exception is passed to the control plane from the data plane with no metadata. During exception processing, the control plane checks the complete set of rules in ACLs 350.

While the security device described in FIG. 1 is capable of executing the approach described herein, this device is simply one example of a security device. Those skilled in the art will appreciate that many other security device designs are capable of performing the processes described herein.

Figure 2:
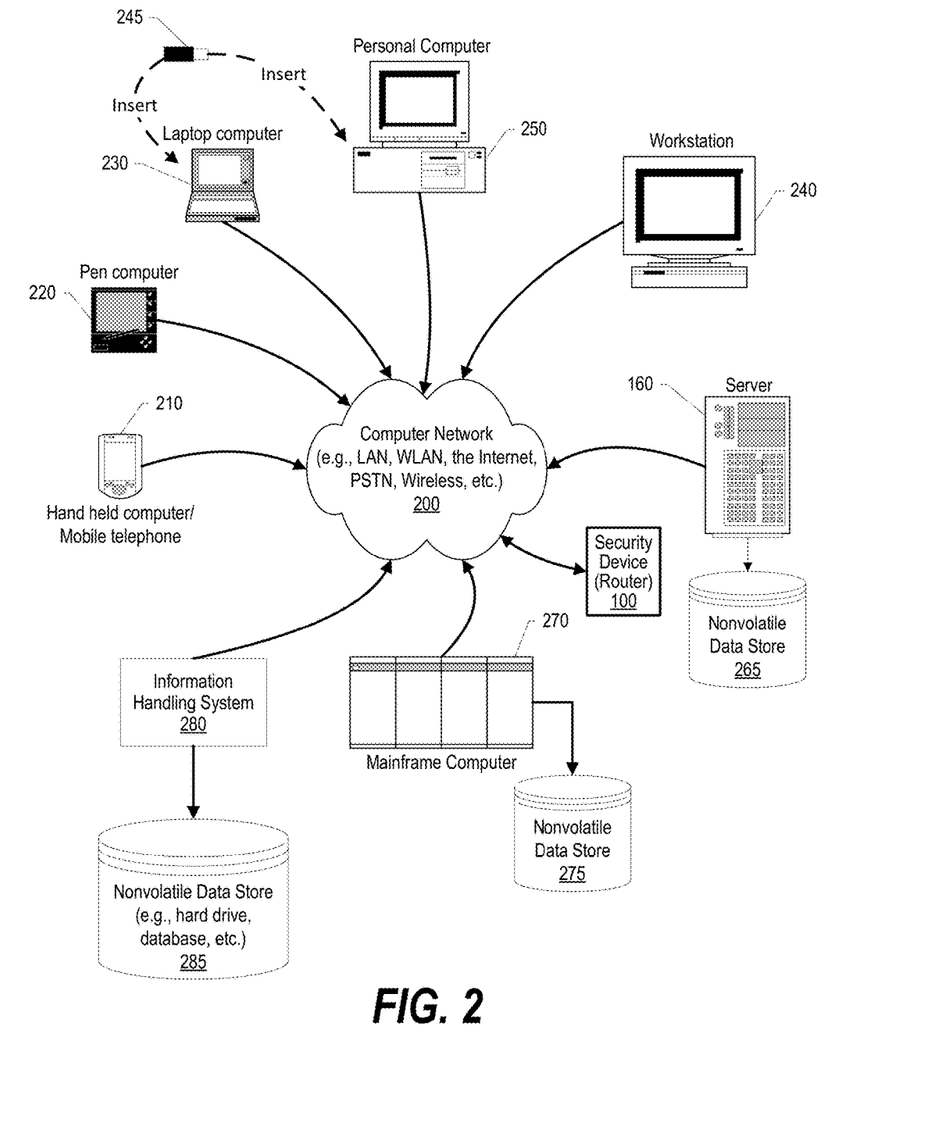
FIG. 2 is a diagram of devices connected over a network that transmit packets to the various devices using security devices such as that shown in FIG. 1.

FIG. 2 is a diagram of devices connected over a network that transmit packets to the various devices using security devices such as that shown in FIG. 1. Types of information handling systems range from small handheld devices, such as handheld computer/mobile telephone 210 to large mainframe systems, such as mainframe computer 270. Security device, such as router 100, are used to process packets transmitted through network 200, such as the Internet.

Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 245 can be shared among two or more information handling systems using various techniques, such as connecting the removable nonvolatile storage device 245 to a USB port or other connector of the information handling systems.

Figure 3:
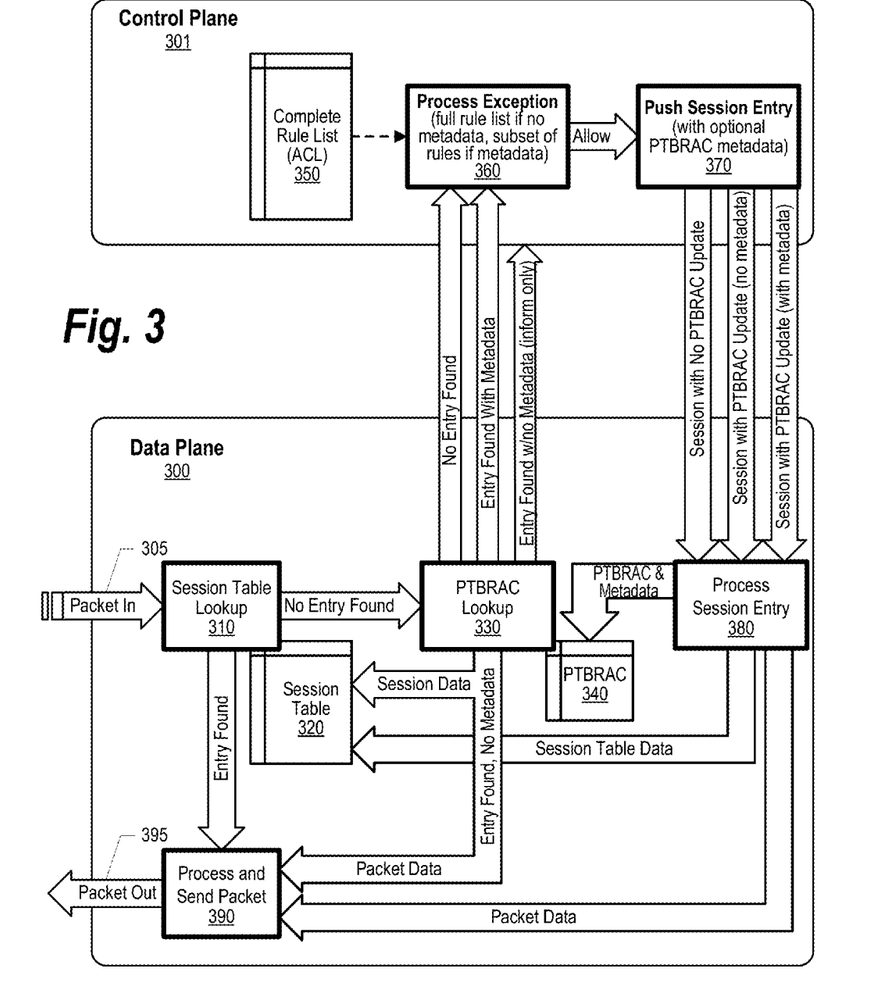
FIG. 3 is a diagram depicting flows between a data plane and a control plane of a security device.

FIG. 3 is a diagram depicting flows between a data plane and a control plane of a security device. Incoming packet 305 arrives at the security device where it is received at data plane 300. During session table lookup 310, the data plane determines whether the incoming packet already belongs to an existing session that is being handled by the security device by comparing packet identifiers (e.g., source IP, destination IP, protocol, destination port, and source port) with identifiers corresponding to each entry of session table 320. If the incoming packet already belongs to an existing session being handled by the security device, then the packet is processed and sent out (packet out 395) in process 390.

On the other hand, if the incoming packet does not belong to an existing session currently being handled by the security device, then, during lookup process 330, the data plane compares the set of packet identifiers included in the incoming packet with a set of identifiers stored in Predictive Tuples Based Rule Assist Cache (PTBRAC) 340, which is a table stored in the memory of the security device. In one embodiment, a four-tuple match is performed matching the source IP, destination IP, protocol, and destination port from the incoming packet with corresponding fields found in PTBRAC 330 (the source port field is not matched in this embodiment).

PTBRAC lookup process 330 results in one of three possible outcomes. In the first outcome, if an entry in PTBRAC 330 matches the packet identifiers of the incoming packet, then a new session can be established for the incoming packet without performing exception processing by the control plane. In one embodiment, data plane 300 creates a new session table for the incoming packet by adding a new session table entry to table 320. In addition, the data plane can notify the control plane so that the control plane can update its statistics and its own session table, but no exception processing or rule lookups need to be performed by the control plane for this packet.

The last two outcomes result in an exception being pushed from the data plane to the control plane for either a check of the full rule list in ACLs 340 or a partial rule check as described herein. The second outcome is an embodiment that utilizes metadata in the PTBRAC entries that reference a subset of rules from ACLs 350 that might be included in some of the PTBRAC entries. If the entry in the PTBRAC that matches the identifiers in the incoming packet includes such metadata, then data plane 300 pushes the packet and the metadata to control plane 301 to perform exception process 340. In this case, the control plane only needs to process the rules referenced by the metadata rather than the complete set of rules included in ACLs 350. In the third outcome, If no entry is found in PTBRAC 340 that matches the identifiers in the incoming packet, then the incoming packet is pushed to control plane 301 for exception processing 360 that utilizes the complete set of rules included in ACLs 350.

Control plane 301 handles exceptions sent to it from data plane 300. These exceptions are handled by exception handling process 360. Exceptions include packet data (identification data such as the packet's source IP, destination IP, protocol, destination port, and source port) and may include metadata that references a subset of the rules included in ACLs 350. Exception process 360 either processes the incoming packet against the complete rule set found in ACLs 350 or a subset of the rules with the subset being referenced by metadata sent to the control plane from the data plane.

After the packet has been processed against the rules (either a subset of rules or the complete rule list), then the packet is either denied or allowed. If allowed, the control plane pushes a session entry for the packet back to the data plane in push session entry process 370. While the control plane was processing the allowed packet against the rules, one of three conditions occurred. First, if the packet matched a five-tuple rule from ACLs 350 that included a specified source port, then the session is pushed with no PTBRAC update so that the PTBRAC table will not be updated. Second, if the packet matched a rule that did not specify a source port and the control plane did not identify any rules that would create a conflict if another packet was received with a different source port, then the session is pushed with a PTBRAC update that includes no metadata. Third, if the packet matched a rule that did not specify a source port but the control plane identified one or more rules that would create a conflict if another packet was received with a different source port, then the session is pushed with a PTBRAC update that includes metadata that reference each of the rules that were found that would create a conflict if another packet was received with a different source port.

Returning to data plane processing, the data plane performs session entry process 380 to process the session pushed to the data plane from the control plane. A new session table entry is added to session table 320 for any packet pushed to the data plane from the control plane. A new PTBRAC entry is also added for any session pushed to the data plane that included PTBRAC data by the control plane. The PTBRAC data is updated with metadata that reference a subset of rules if such metadata was pushed to the data plane by the control plane and is updated without metadata if such metadata was not provided by the control plane. The packet data pushed to the data plane is then processed and the packet is sent out at data plane process 390. Outgoing packet 395 is then transmitted to another device or process to handle the packet data (e.g., a server, etc.).

Figure 4:
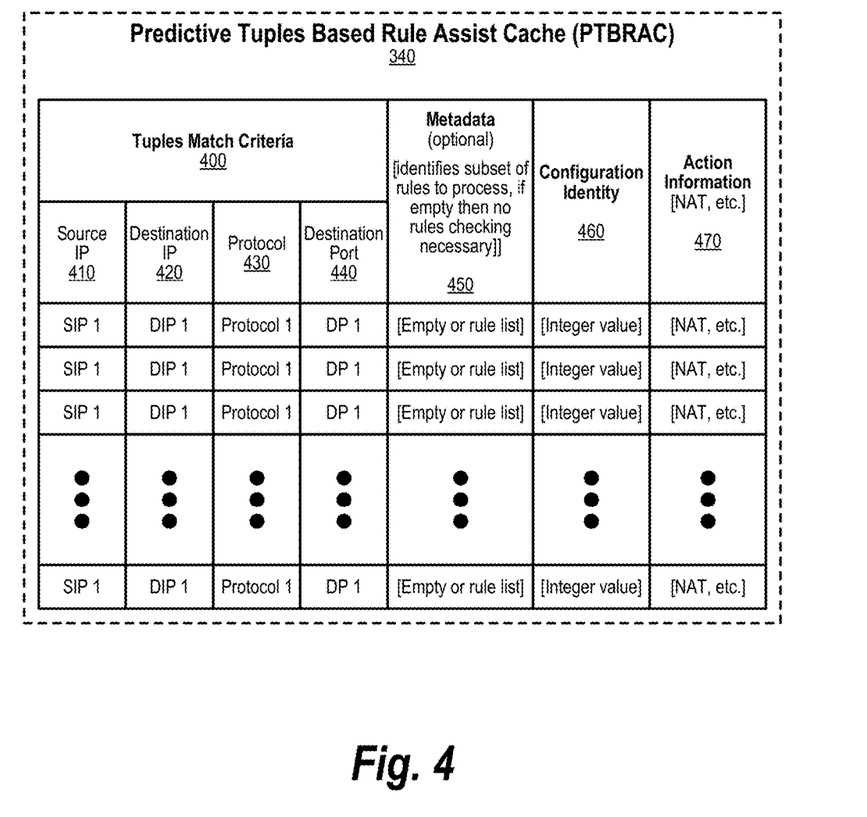
FIG. 4 is a diagram depicting the various data fields in a Predictive Tuples Based Rule Assist Cache (PTBRAC) utilized in a security device.

FIG. 4 is a diagram depicting the various data fields in a Predictive Tuples Based Rule Assist Cache (PTBRAC) utilized in a security device. In one embodiment, four-tuple match criteria 400 is used to match against incoming packets. The four-tuple match criteria includes source IP 410, destination IP 420, protocol 430, and destination port 440. In this embodiment, the source port is not included as one of the tuples.

Metadata 450 is an optional field and references a subset of the rules found in the complete rule list (ACLs). If an entry is found by the control panel that identified one or more rules that would create a conflict if another packet was received with a different source port, then those rules would be referenced in metadata field 450.

Next, configuration identity field 460 is an integer field that ties the PTBRAC entries to a particular control plane rule configuration. When the control plane rule configuration changes because of administrator edits, the PTBRAC entries created earlier are no longer valid. Use of the configuration identity field enables the data plane to use the PTBRAC entries only as long as the configuration is valid.

Finally, action information field 470 is the action that is to be performed on the packet matching the entry, such as a network address translation (NAT), etc.

Figure 5:
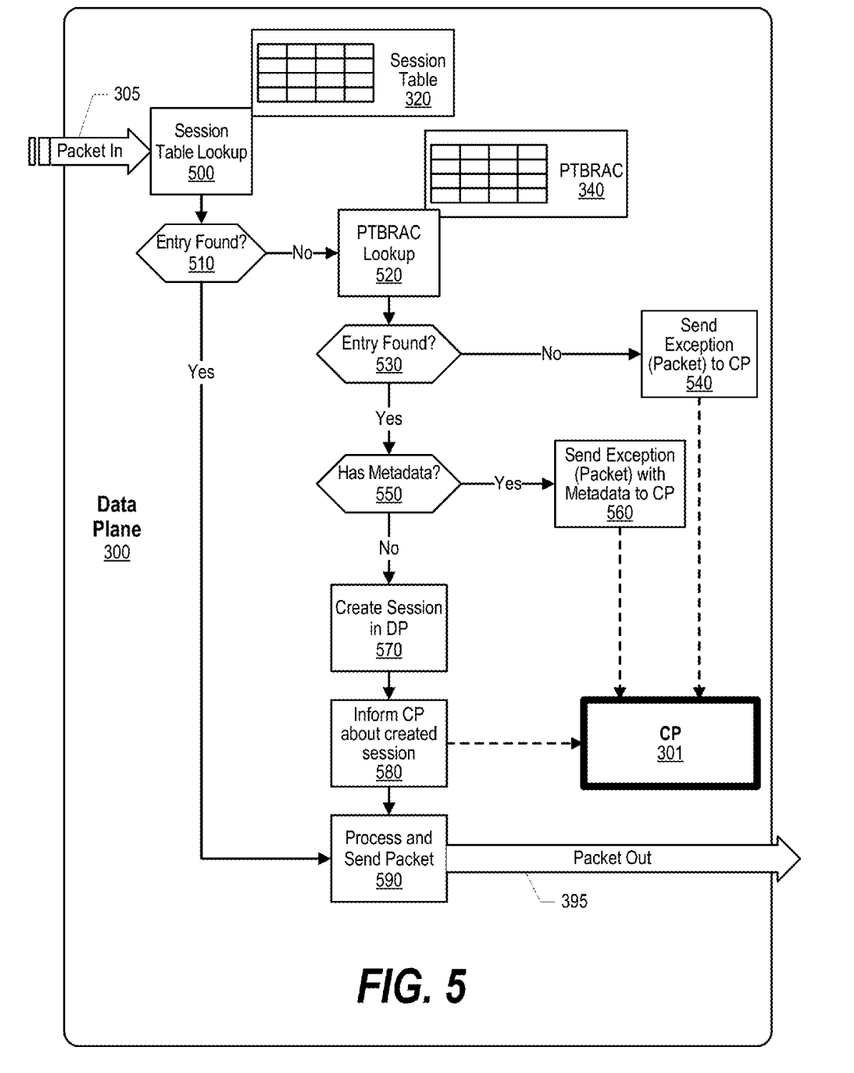
FIG. 5 is a diagram depicting one example of a flowchart showing steps taken by the data plane in a security device to process an incoming packet.

FIG. 5 is a diagram depicting one example of a flowchart showing steps taken by the data plane in a security device to process an incoming packet. At step 500, the data plane performs a session table lookup that matches the packet identifier data with identifier data for currently established sessions that are stored in session table 320. The process determines as to whether an entry was found in the session table indicating that the incoming packet already belongs to an existing session (decision 510). If an entry was found in the session table, then decision 510 branches to the 'yes' branch bypassing steps 520 through 580 and proceeding directly to process the packet and send the packet out at step 590.

On the other hand, if an entry was not found in the session table, then decision 510 branches to the 'no' branch for further processing of the incoming packet. At step 520, the data plane performs a PTBRACs lookup that matches four-tuples of the incoming packet with the four-tuple entries found in the Predictive Tuples Based Rule Assist Cache (PTBRAC) table. The process determines as to whether an entry was found in the PTBRAC table matching the incoming packet indicating that the incoming packet can receive expedited treatment (decision 530). If an entry was found in the PTBRAC table matching the incoming packet, then decision 530 branches to the 'yes' branch for expedited rules processing. On the other hand, if an entry was not found in the PTBRAC table matching the incoming packet, then decision 530 branches to the 'no' branch whereupon, at step 540, the data plane sends an exception to control plane 301 to process the incoming packet against the complete set of rules. This indication is made because no metadata is included with the packet that is sent to the control plane.

The data plane determines as to whether the entry found in the PTBRAC table included metadata that reference a subset of rules (decision 550). If the entry found in the PTBRAC table included metadata, then decision 550 branches to the 'yes' branch whereupon, at step 560 the data plane sends an exception to control plane 301 to process the incoming packet against a subset of the rules as referenced by the metadata.

On the other hand, if the entry found in the PTBRAC table did not include any metadata, then decision 550 branches to the 'no' branch to create a new session without performing any rules checking by the control plane. At step 570, the process creates a new session in the data plane, the new session data is added to session table 320. At step 580, the data plane process informs the control plane about the created session so that the control plane can update its statistics and any copy of the session table maintained by the control plane. At step 590, the control plane processes the packet and sends the packet out (packet out 395).

Figure 6:
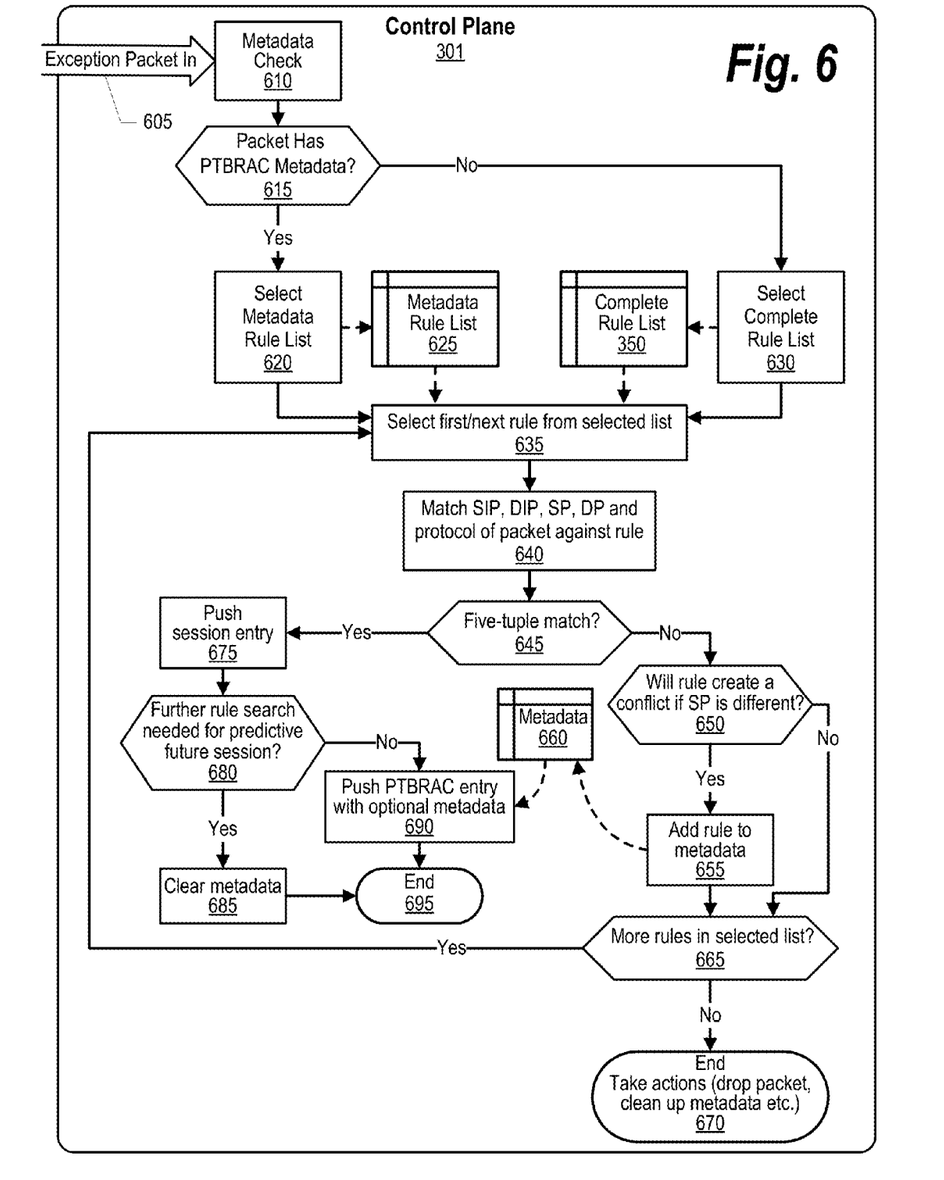
FIG. 6 is a diagram depicting one example of a flowchart showing steps taken by the control plane in a security device.

FIG. 6 is a diagram depicting one example of a flowchart showing steps taken by the control plane in a security device. At step 610, the control plane checks incoming exception packet 605 for any metadata that references a subset of the access control rules. The control plane determines as to whether the incoming exception packet has any PTBRAC metadata that references a subset of the rules (decision 615). If the incoming exception packet has any PTBRAC metadata, then decision 615 branches to the 'yes' branch whereupon at step 620, the control plane selects the rules referenced by the metadata included with the incoming exception packet. On the other hand, the incoming exception packet does not have any PTBRAC metadata, then decision 615 branches to the 'no' branch whereupon at step 630, the control plane selects the complete rule list (ACLs 350) as the rules to process the packet against.

At step 635, the control plane selects the first rule from selected list (either the metadata included with the incoming packet or the complete rule list). At step 640, the process matches source IP, destination IP, source port, destination port, and protocol of the packet against corresponding identifiers in the selected rule. Decision 645 sets up a loop in the control plane that continues until the identifiers in the packet match all five tuples in the selected rule (decision 645). Whenever a five-tuple match does not occur, decision 645 branches to 'no' branch to check for possible metadata to add to any future PTBRAC entry by using decision 650 and step 655.

The process determines as to whether the selected rule will create a conflict if the source port is different because the rule specifies a source port different than the incoming packet but has all other tuples that match the incoming packet identifiers (decision 650). If the selected rule will create a conflict if the source port is different because the rule specifies a source port different than the incoming packet but has all other tuples that match the incoming packet identifiers, then decision 650 branches to the 'yes' branch whereupon, at step 655, the control plane adds the selected rule to metadata which is stored in memory area 660.

On the other hand, if the selected rule will not create a conflict, then decision 650 branches to the 'no' branch bypassing step 655. The control plane determines as to whether there are more rules in selected rules list to process (decision 665). If there are more rules in selected rules list to process, then decision 665 branches to the 'yes' branch which loops back to select and process the next rule from the selected list. This looping continues until either a five-tuple match is found at decision 645 or there are no additional rules to process. If there are no more rules to process, then decision 665 branches to the 'no' branch and processing ends at 670

Returning to decision 645, when a five-tuple match is found with a selected rule that matches all five identifiers of the incoming packet, then decision 645 branches to 'yes' branch whereupon, at step 675, the control plane pushes the session entry back to the data plane. The control plane determines as to whether further rule search is needed for predictive future sessions because the rule that matched the incoming packet specified a source port rather than using a wildcard (decision 680). If a further rule search is needed for predictive future sessions, then decision 680 branches to the 'yes' branch whereupon, at step 685, the metadata is cleared and a new PTBRAC entry is not pushed to the data plane. On the other hand, if the matching rule did not specify a source port and instead had a wildcard for the source port, then decision 680 branches to the 'no' branch whereupon at step 690, the control plane pushes a new PTBRAC entry to the data plane with any metadata stored in memory area 660 included in the new PTBRAC entry. FIG. 6 processing thereafter ends at 695.

Figure 7:
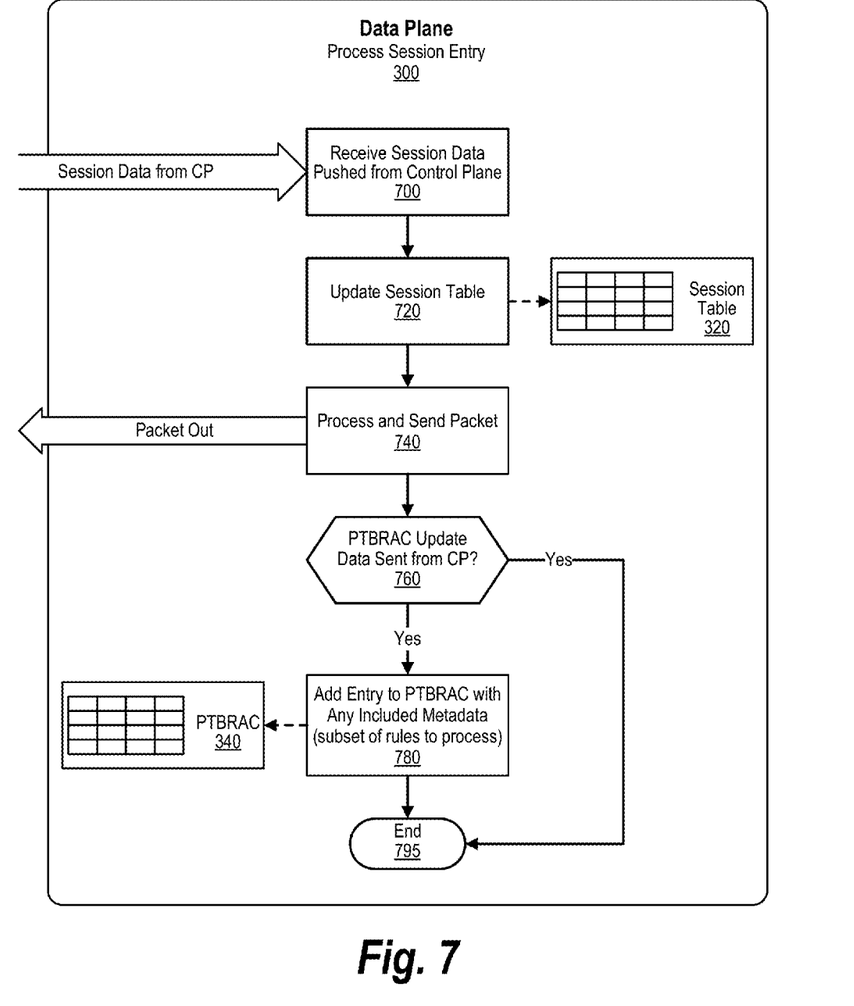
FIG. 7 a diagram depicting one example of a flowchart showing steps taken by the data plane in a security device to process a session entry pushed by the control plane.

FIG. 7 a diagram depicting one example of a flowchart showing steps taken by the data plane in a security device to process a session entry pushed by the control plane. At step 700, the data plane receives session data pushed to the data plane from control plane with the session data including the identifiers of a packet for which a new session is to be established. At step 720, the data plane updates Session Table 320 by adding a new entry to the session table with the identifiers of the incoming packet. At step 740, the data plane processes the incoming packet and sends the packet out (e.g., to a server, etc.).

The data plane determines as to whether PTBRAC update data was also pushed from the control plane to the data plane (decision 760). If PTBRAC update data was pushed to the data plane from the control plane, then decision 760 branches to the 'yes' branch whereupon at step 780, the data plane adds a new entry to PTBRAC table 340 with the new entry including any metadata (subset of rules to process) that was provided by the control plane. In one embodiment, the four tuples included in the PTBRAC include the source IP, the destination IP, the destination port, and the protocol but does not include the source port. On the other hand, if no PTBRAC update data was sent from the control plane, then decision 760 branches to the 'no' branch bypassing step 780. FIG. 7 processing thereafter ends at 795.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system."

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other circuit element objects to function in a particular manner, such that the instructions stored in the computer readable medium produce an article of manufacture including instructions which implement the function/act specified in the flowchart and/or block diagram block or blocks.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method of establishing network sessions by a network security device, the method comprising:
  comparing, at a data plane of the security device, a set of packet identifiers included in an incoming packet with a plurality of sets of identifiers stored in a session table stored in a memory of the security device, wherein each entry of the session table corresponds to an existing flow session being handled by the security device;
  comparing, at the data plane of the security device, a subset of the set of packet identifiers included in the incoming packet with a plurality of sets of identifiers stored in a second table stored in the memory of the security device if said comparing the set of packet identifiers with the sets of identifiers stored in the session table fails to provide a match, wherein
    each of the plurality of sets of identifiers corresponds to an entry in the second table,
    members of the subset of the set of packet identifiers are fewer than the entirety of members of the set of packet identifiers,
    the second table is distinct from the session table,
    the set of incoming packet identifiers comprises a source IP, a destination IP, a protocol, a destination port, and a source port,
    each of the sets of identifiers in the second table comprise an expected source IP, an expected destination IP, an expected protocol, and an expected destination port, and
    the incoming packet does not belong to an existing flow session currently being handled by the security device; and
  establishing a new flow session corresponding to the incoming packet in response to the set of packet identifiers matching one of the entries in the second table.

2. The method of claim 1 wherein the entry in the second table references a subset of rules, the method further comprising:
  sending an exception from the data plane of the security device to a control plane of the security device;
  checking, by the control plane, one or more of the subset of rules referenced by the entry, wherein the subset of rules are retrieved from one or more access control lists (ACLs); and
  pushing a session entry from the control plane back to the data plane in response to one of the subset of rules allowing the incoming packet, wherein the new flow session is established in response to the pushed session entry.

3. The method of claim 1 further comprising:
comparing, at the data plane of the security device, a second set of packet identifiers included in a second incoming packet with the plurality of sets of identifiers stored in the memory of the security device that each correspond to one of the entries in the second table, wherein
  the second incoming packet does not belong to one of the existing flow sessions currently being handled by the security device as provided by entries of the session table,
  the set of incoming packet identifiers and the set of second incoming packet identifiers both include a source IP, a destination IP, a protocol, a destination port, and a source port, and
  each of the sets of identifiers in the second table include an expected source IP, an expected destination IP, an expected protocol, and an expected destination port; and
sending, to a control plane of the security device, an exception corresponding to the second incoming packet in response to the set of packet identifiers failing to match at least one of the entries in the second table.

4. The method of claim 3 further comprising:
matching, by the control plane, the second set of packet identifiers against a plurality of rules retrieved from one or more access control lists (ACLs);
adding an entry to the second table in response to determining that one of the rules matches the second set of packet identifiers and that the matched rule fails to specify an expected source port; and
pushing, by the control plane, a new session to the data plane to establish the new flow session corresponding to the second incoming packet.

5. The method of claim 3 further comprising:
matching, by the control plane, the second set of packet identifiers against a plurality of rules retrieved from one or more access control lists (ACLs);
identifying one or more non-matched rules in the ACLs wherein each of the identified non-matched rules have identifiers that match the source IP, the destination IP, the protocol, and the destination port but each specify a source port that fails to match the second incoming packet's source port;
adding an entry to the second table in response to determining that one of the rules matches the second set of packet identifiers and that the matched rule fails to specify an expected source port, wherein the entry includes a metadata referencing each of the non-matched rules; and
pushing a new session to the data plane to establish the new flow session corresponding to the second incoming packet.

6. The method of claim 3 further comprising:
matching, by the control plane, the second set of packet identifiers against a plurality of rules retrieved from one or more access control lists (ACLs);
inhibiting a new entry addition to the second table in response to determining that one of the rules matches the second set of packet identifiers and that the matched rule specifies an expected source port; and
pushing a new session to the data plane to establish the new flow session corresponding to the second incoming packet.

7. A network security device comprising:
one or more processors;
a network adapter accessible by at least one of the processors that receives a plurality of packets from a computer network;
a memory accessible by at least one of the processors;
one or more Access Control Lists (ACLs) stored in the memory; and
a packet handling engine stored in the memory of the network security device and executed by at least one of the processors, wherein the packet handling engine is configured to:
  compare, at a data plane of the network security device, a set of packet identifiers included in an incoming packet with a plurality of sets of identifiers stored in a session table stored in the memory, wherein each entry of the session table corresponds to an existing flow session being handled by the network security device
  compare, at the data plane of the network security device, a subset of the set of packet identifiers included in the incoming packet with a plurality of sets of identifiers stored in a second table in the memory if comparing the set of packet identifiers with the sets of identifiers stored in the session table fails to provide a match, wherein
    each of the plurality of sets of identifiers corresponds to an entry in the second table,
    members of the subset of the set of packet identifiers are fewer than the entirety of members of the set of packet identifiers,
    the set of incoming packet identifiers includes a source IP, a destination IP, a protocol, a destination port, and a source port,
    each of the sets of identifiers in the second table include an expected source IP, an expected destination IP, an expected protocol, and an expected destination port, and
    the incoming packet does not belong to an existing flow session currently being handled by the network security device; and
  establish, in the session table, a new flow session corresponding to the incoming packet in response to the set of packet identifiers matching one of the entries in the second table.

8. The network security device of claim 7 wherein the entry does not reference any subset of rules.

9. The network security device of claim 7 wherein the entry in the second table references a subset of rules, and the packet handling engine is further comprised to:
send an exception from the data plane of the security device to a control plane of the security device;
check, by the control plane, one or more of the subset of rules referenced by the entry, wherein the subset of rules are retrieved from one or more access control lists (ACLs); and
push a session entry from the control plane back to the data plane in response to one of the subset of rules allowing the incoming packet, wherein the new flow session is established in response to the pushed session entry.

10. The network security device of claim 7 wherein the packet handling engine is further comprised to:
compare, at the data plane of the security device, a second set of packet identifiers included in a second incoming packet with the plurality of sets of identifiers stored in the memory of the security device that each correspond to one of the entries in the second table, wherein the second incoming packet does not belong to one of the existing flow sessions currently being handled by the security device, and wherein the set of incoming packet identifiers and the set of second incoming packet identifiers both include a source IP, a destination IP, a protocol, a destination port, and a source port, and wherein each of the sets of identifiers in the second table include an expected source IP, an expected destination IP, an expected protocol, and an expected destination port; and send, to a control plane of the security device, an exception corresponding to the second incoming packet in response to the set of packet identifiers failing to match at least one of the entries in the second table.

11. The network security device of claim 10 wherein the packet handling engine is further comprised to:

match, by the control plane, the second set of packet identifiers against a plurality of rules retrieved from one or more access control lists (ACLs);

add an entry to the second table in response to determining that one of the rules matches the second set of packet identifiers and that the matched rule fails to specify an expected source port; and push a new session to the data plane to establish the new flow session corresponding to the second incoming packet.

12. The network security device of claim 10 wherein the packet handling engine is further comprised to:

match, by the control plane, the second set of packet identifiers against a plurality of rules retrieved from one or more access control lists (ACLs);

identify one or more non-matched rules in the ACLs wherein each of the identified non-matched rules have identifiers that match the source IP, the destination IP, the protocol, and the destination port but each specify a source port that fails to match the second incoming packet's source port;

add an entry to the second table in response to determining that one of the rules matches the second set of packet identifiers and that the matched rule fails to specify an expected source port, wherein the entry includes a metadata referencing each of the non-matched rules; and push a new session to the data plane to establish the new flow session corresponding to the second incoming packet.

13. The network security device of claim 10 wherein the packet handling engine is further comprised to:

match, by the control plane, the second set of packet identifiers against a plurality of rules retrieved from one or more access control lists (ACLs);

inhibit a new entry addition to the second table in response to determining that one of the rules matches the second set of packet identifiers and that the matched rule specifies an expected source port; and push a new session to the data plane to establish the new flow session corresponding to the second incoming packet.

* * * * *